United States Patent [19]

Cinque et al.

[11] 4,210,936

[45] Jul. 1, 1980

[54] METHOD AND APPARATUS FOR REPRODUCING AN ORIGINAL GRAY SCALE IMAGE

[75] Inventors: Gregory M. Cinque, Stamford; Roger W. Pryor, Trumbull; Arthur Rubinstein, Norwalk, all of Conn.

[73] Assignee: Pitney Bowes Inc., Stamford, Conn.

[21] Appl. No.: 864,208

[22] Filed: Dec. 27, 1977

[51] Int. Cl.² .......................... H04N 1/40; G01B 1/29
[52] U.S. Cl. ................................. 358/283; 358/284; 358/298; 364/515
[58] Field of Search ...................... 358/283, 298, 284; 346/1, 140 R, 110 R; 364/515

[56] References Cited

U.S. PATENT DOCUMENTS

| | | | |
|---|---|---|---|
| 3,373,437 | 3/1968 | Sweet et al. | 178/96 |
| 3,604,846 | 9/1971 | Gamske et al. | 360/90 |
| 3,977,007 | 8/1976 | Berry et al. | 358/283 |

OTHER PUBLICATIONS

S. K. Gupta, "Production of Pseudo-Half-Tone Images," I.B.M. Technical Disclosure Bulletin, vol. 19, No. 1, pp. 290-291, 6-76.

Primary Examiner—Robert L. Griffin
Assistant Examiner—Edward L. Coles
Attorney, Agent, or Firm—William D. Soltow, Jr.; Albert W. Scribner; Martin D. Wittstein

[57] ABSTRACT

A method and apparatus are disclosed for reproducing an original gray scale image that may be divided into an array of discrete picture elements. The method comprises the steps of scanning each of the picture elements in the array on the original image to determine its gray level and location in the array and generating sequential signals that contain data indicative of the gray level and location in the array of each of the scanned picture elements. The gray level of the entire array is calculated from the data on each of its individual picture elements in accordance with a gray scale function. On a reproduction medium in an array of reproduction locations corresponding to the picture element array, locations are sequentially darkened in order of decreasing gray level, beginning at the location that corresponds to the scanned picture element having the darkest gray level, until the gray level of the reproduction array substantially equals the calculated gray level of the scanned picture element array. Therefore, the gray level distribution of the picture element array is substantially duplicated on the reproduction array to provide maximum resolution within the capability of the scanning and darkening systems. In addition, this method reduces the amount of data processed in order to reproduce maximum image resolution. The apparatus for performing this method comprises various components for performing each of its steps.

23 Claims, 7 Drawing Figures

Fig. 1.
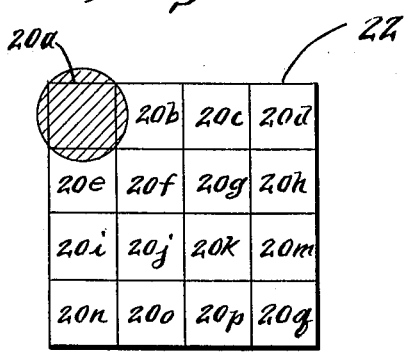
Fig. 2.
Fig. 3.
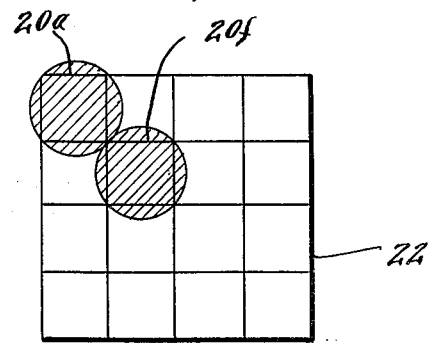
Fig. 4.
Fig. 5.
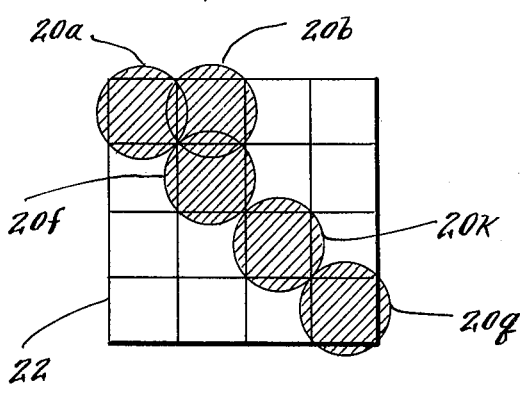
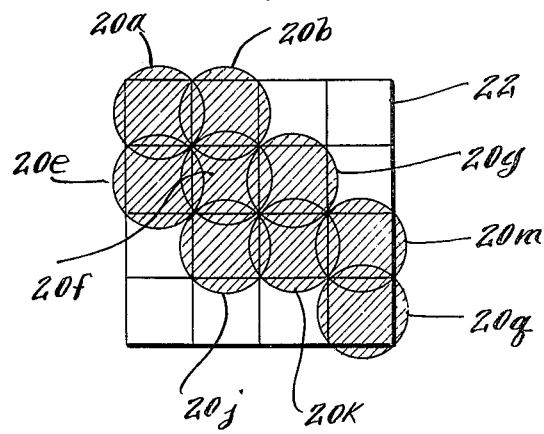

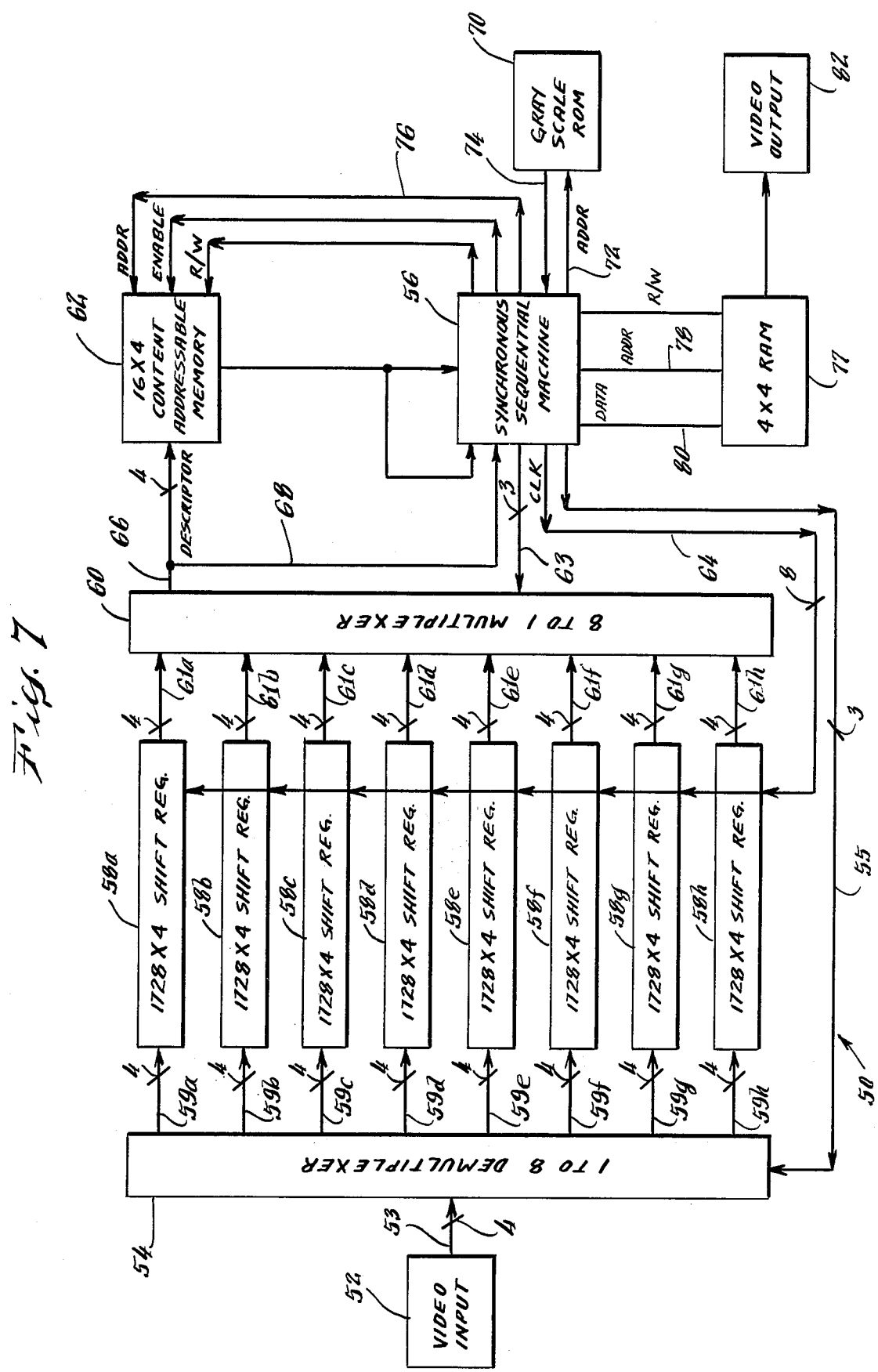

METHOD AND APPARATUS FOR REPRODUCING AN ORIGINAL GRAY SCALE IMAGE

BACKGROUND OF THE INVENTION

1. Field of the Invention

The present invention relates to a method and apparatus for reproducing an original gray scale or half-tone image on a reproduction medium.

Both alpha-numeric and pictorial images may be reproduced by this method and apparatus. Moreover, the image may be reproduced at the site of the original image or a site remote from the original image using known data transmission techniques.

2. Description of the Prior Art

Various methods and apparatus have been proposed in the past for reproducing gray scale or half-tone images by either darkening or not darkening areas on a reproduction medium. For example, U.S. Pat. No. 3,604,846 (Behane et al.) discloses a system in which original images are divided into discrete picture elements or pels, each of which is scanned to determine its gray level. Each pel is reproduced as a matrix of, for example, nine locations, some or all of which are darkened by an ink jet printing mechanism that prints dots, each having maximum density within the capability of the printing mechanism. Variations in the gray level of the pel are approximated by printing greater or fewer dots in a given matrix area, the entire image being comprised of a large number of matrix areas, each corresponding to one pel. A given original pel gray level produces a reproduction matrix always having the same number of dots. Further, original pels of increasing gray levels are reproduced by printed matrices having increasing numbers of dots printed in regular patterns beginning in the upper left corner thereof and filling toward the lower right corner. Thus a pel having a gray level requiring six dots to be printed will always be reproduced as a matrix with six dots clustered toward the upper left corner.

U.S. Pat. No. 3,373,437 (Sweet et al.) discloses a fluid droplet printing apparatus in which half-tones are reproduced by varying the number of drops deposited in a given dot area to vary the density thereof.

U.S. Pat. No. 3,977,007 (Berry et al.) discloses a gray tone generation system which reproduces pels having differing shades of gray by depositing, at predetermined dot locations in a matrix, a number of dots of ink calculated to represent the shade being recorded. The Berry system is similar to that disclosed in the Behane et al. Patent. However, the matrix is not filled in a regular order to represent gradations of gray level. Instead, the matrix locations are filled in an ordered, though random, pattern to approximate the gray level. That is, if the gray level being reproduced requires printing of eight dots in a sixteen location matrix, the dots are always printed in the same locations. However, the printed locations are not clustered or otherwise arranged in a regular manner as they are in the Behane et al. matrix.

Methods and apparatus for generating half-tone images such as those disclosed in the patents reviewed above have certain drawbacks. First, because original image pels are reproduced by matrices of ordered patterns of dots, the resolution of the image is necessarily limited. Second, because each pel is represented by a matrix of many dots, relatively large amounts of data are needed to reproduce a pel gray level that could otherwise be expressed with relatively little data. For example, if it is assumed that a pel has an arbitrary gray level of from (1) to (16), (1) representing the lightest level, (16) representing the darkest level, the pel gray level may be digitally represented by only four bits of data. However, if the pel is reproduced on a matrix of four-by-four dot locations, each of which may or may not be darkened in a random manner, 16 bits of data are necessary to digitally represent the matrix. Moreover, such systems are limited by the mechanical capability of the printing mechanism which they use and, in particular, by the minimum dot size that may be printed. For example, if the ratio of the area of the original image to the reproduced image is to be one-to-one, if the system's printer can print a maximum of 200 dots per inch, and if each pel is represented by a four-by-four dot matrix, then the maximum number of pels which may usefully be scanned per inch is 50. Yet, this limitation further reduces the resolving power of the system which may be optimized by dividing the original image into as many pels as possible within the system capability.

These drawbacks may be traced to the fact that prior art systems such as those described only consider pel gray levels and do not consider gray level distribution. That is, these systems only consider the first moment of the pel function of both gray level and distribution. The method and apparatus of the present invention are intended to remedy these drawbacks.

SUMMARY OF THE INVENTION

The method and apparatus of the present invention reproduce an original gray scale or half-tone image by dividing the image into a number of picture elements organized into regular picture element matrices. When reproduced, each picture element is represented by a single location that may or may not be darkened in a reproduction matrix of locations, corresponding to one picture element matrix. Each picture element is not represented by an entire matrix of locations that may or may not be darkened, as is the case with prior art systems. Further, dots are printed on the reproduction matrix in numbers sufficient to substantially equal the gray level of each picture element matrix, at locations in accordance with the gray level distribution or pattern of the picture element matrix, that is, taking into account a higher than first order moment of pel function data. Moreover, the resolution of an image reproduced by this method and apparatus is far superior to prior art systems because the system takes advantage of the maximum capability of the system scanning and reproduction capabilities. This advantage is possible because each pel is represented by one reproduction matrix location. Therefore, if a printer is capable of printing 200 dots per inch, a scanner capable of scanning 200 pels per inch may be used in conjunction with it. However, the invention still makes use of rapid data processing and transmission techniques and, in fact, achieves a compression rather than expansion of data since the reproduction matrix utilizes less gray scale data than that generated from the original picture element matrix. Specifically, if representation of a pel gray level requires four bits of data, as in the example given above, reproduction of this gray level requires only one bit of data since the reproduction matrix location corresponding to the pel of interest either is or is not darkened.

Therefore, the method and apparatus of the invention provide superior image resolution, compared to prior art systems, with a compression rather than an expansion of data that must be processed.

In its preferred embodiment, the method of invention comprises the steps of scanning each of the picture elements in a picture element matrix or other regular array to determine both its gray level and its location in the array and generating sequential signals that contain data indicative of the gray level and location in the array of each of the scanned picture elements. The gray level of the array is calculated from the gray level data relating to each of its individual picture elements in accordance with a gray scale function, for example, a linear or quadratic function. Then, on the reproduction medium in a reproduction array of locations corresponding to the picture element array, locations are sequentially darkened in order of decreasing gray level beginning at the location that corresponds to the scanned picture element having the darkest gray level until the gray level of the reproduction array substantially equals the calculated gray level of the scanned picture element array. That is, the locations in the reproduction array corresponding to the darkest locations in the picture element array are darkened until the total gray level of the arrays is substantially equal in accordance with the gray scale function.

Since the discrete locations that are darkened correspond to the darkest scanned picture element locations, the pattern of darkness in the reproduction array closely approximates that of the picture element array. Accordingly, the resolution achievable with this method represents a substantial improvement over prior art methods wherein matrix locations are darkened in a fixed pattern until the total gray level is approximately equal to the gray level of but one picture element.

The apparatus for performing the method of the present invention includes a scanner for scanning each of the picture elements in the picture element array to determine its gray level and location. The scanner and support circuitry generate signals that contain data indicative of the gray levels and locations in the array of each of the picture elements. The signals are conducted to a memory that stores the data relating to each of the picture elements, at least until all information about all picture elements in an array is stored. A calculator, connected to the memory, calculates the gray level of the array in accordance with the gray scale function from the individual gray levels of each of the picture elements and, in particular, from the total of the individual gray levels of the picture elements. A reproduction means, which may, for example, be an ink jet printer or video output, is capable of darkening selected locations in a reproduction array arranged to correspond to the picture element array. A control in the form of a synchronized sequential machine is connected to the memory and calculator and controls the reproduction means to sequentially darken selected locations on the reproduction array in the order of decreasing gray level, beginning with that corresponding to the picture element having the darkest gray level, until the gray level of the reproduction medium array substantially equals the calculated gray level of the scanned picture element array.

Accordingly, it is an object of the present invention to provide a method and apparatus for reproducing a gray scale image either at a site remote from the original image or in the vicinity thereof with superior resolution and reduced data transmission and storage requirements.

Other objects, aspects and advantages of the present invention will be pointed out in or will be understood from the following detailed description provided below in conjunction with the accompanying drawings.

BRIEF DESCRIPTION OF THE DRAWINGS

FIG. 1 is a diagrammatic representation of a picture element matrix forming one small part of an original image to be reproduced.

FIG. 2 is a diagrammatic representation of a reproduction matrix, after the first darkening step has been performed to reproduce the picture element array.

FIGS. 3, 4 and 5 are diagrammatic representations of darkening steps 2, 5 and 9 in reproduction of the gray scale image shown in FIG. 1 illustrating the completion of the darkened pattern approximately duplicating the original image being reproduced.

FIG. 7 is a schematic diagram of the apparatus of the present invention for performing the steps in accordance with the method.

DETAILED DESCRIPTION OF THE PREFERRED EMBODIMENTS

Figure 6:
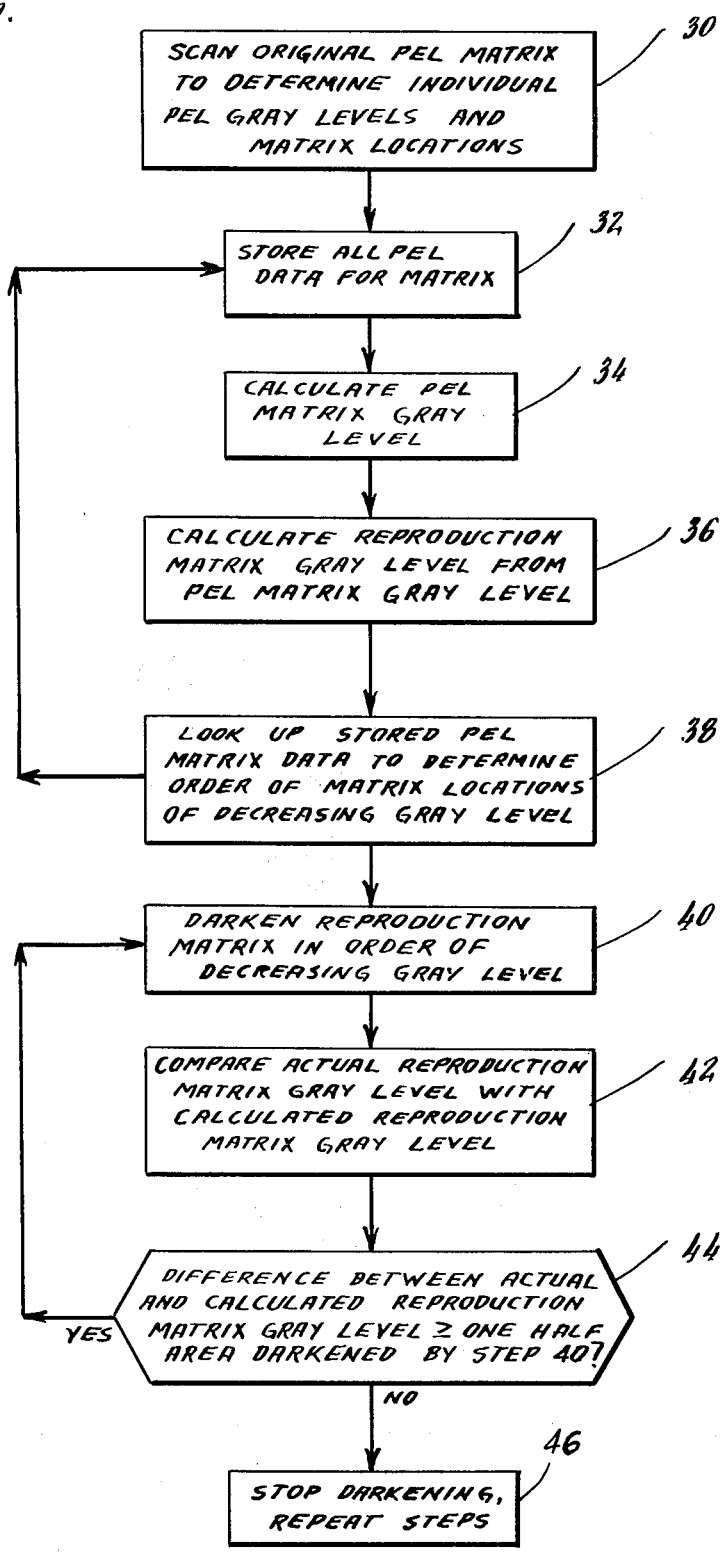
FIG. 6 is a block diagram illustrating the steps of the preferred embodiment of the method of the present invention.

The method and apparatus of the present invention is capable of reproducing a gray scale image such as a pictorial or textual image. The image may be broken down into discrete picture elements or pels that may be arranged in any form of array, but which are preferable arranged in any desirable regular arrays such as rectangular matrices. In this manner, the original image may be quantized for reproduction. As noted above, both the method and apparatus of the invention reproduce the original image by reproducing a gray scale distribution or pattern in accordance with the original in each of the matrices into which the original is divided.

The principles by which both the method and apparatus of the invention operate may be explained with reference to FIGS. 1 through 5.

FIG. 1 is a diagrammatic representation of one matrix 10 of pels 12 into which the original image has been divided. The matrix comprises sixteen pels 12a through 12q, arranged in a four-by-four pattern. Matrices of different pel dimensions, such as, for example, two-by-two, three-by-three, or greater are possible. Generally, however, smaller matrices are limited in their ability to resolve the original image with great clarity. Larger matrices require greater data processing capability as will become apparent from the description of the apparatus of the present invention provided below. It has been found that a four-by-four matrix provides excellent resolution, yet does not require inordinate data processing capability.

In the example chosen for illustration, each of the sixteen pels 12 may have a gray scale or half-tone level ranging from an arbitrary value of (1) to (16), (1) being assigned to the lightest gray level, (16) being assigned to the darkest gray level. In the example of FIG. 1, an upper-left to lower-right diagonal of pels each has a gray level of (16). Each of the pels which parallel the diagonal and are adjacent thereto have a gray level of (7). The three pels at each of the opposing lower-left and upper-right corners of matrix 10 have gray levels of (1). In accordance with the invention, reproduction of the matrix follows the same pattern as the gray level of the individual picture elements therein. That is, depending upon the gray scale function for reproduction employed, the reproduction matrix will be darkened in the same pattern as the darkest picture elements in the picture element matrix. Accordingly, locations in the reproduction matrix corresponding to the picture elements having gray levels of (16) will be darkened first. Locations having gray levels of (7) will then be darkened and finally locations having gray levels of (1) will be darkened. Of course, since (1) is specified to be the lightest level, only in unusual circumstances would a location on a reproduction matrix, corresponding to a pel having a gray level of (1), be darkened.

The number of locations actually darkened depends upon the gray scale function employed. For example, the function may be linear, in which case the gray level of the picture element matrix would be linearly duplicated on the reproduction matrix. For example, if the total gray level of the picture element matrix was (8) on the scale of (1) to (16), 50% of the reproduction matrix area would be darkened. If the picture element matrix had gray level of (12), expressed as an average of all of the picture element gray levels, 75% of the reproduction matrix level would be darkened, again in the same pattern as the darkened areas in the picture element matrix.

However, a linear function need not be used. For example, the gray scale function may be quadratic, which requires that quadratically increasing numbers of dots be printed for linearly increasing picture element gray levels.

The actual operation of the method may be described for such a quadratic function with reference to FIGS. 2 through 5 which illustrate successive darkening steps of locations 20 on a reproduction matrix 22. In the picture element matrix 10 illustrated in FIG. 1, the average gray level of all pels is (7). While other means of quantizing the gray level of a printed dot in relation to the reproduction matrix as a whole may be employed, for purposes of this illustrative example, the dot area will be considered. Assume that the reproduction matrix 22 has sixteen locations 20 and measures 0.020 inch (20 mils) on each side. Accordingly, the area of the reproduction matrix is 0.0004 sq. in. (400 sq. mils). Assume further that in accordance with the quadratic gray scale function, the average gray level (7) of the picture element matrix implies that an area of 0.000315 sq. in. (315 sq. mils) need be darkened to reproduce the gray level of the picture element matrix. If the printing device for darkening each of these locations in the reproduction matrix prints a circular dot having an area of 0.000044 sq. in. (44 sq. mils) on 0.005 in. (5 mil) centers, adjacent dots in either the horizontal or vertical direction of the reproduction matrix have an area of overlap approximately equal to 0.00001 sq. in. (10 sq. mils). (For purposes of this analysis, the extent of dots printed at the rectangular periphery of the matrix beyond that periphery is ignored. Of course, certain reproduction systems may be capable of reproducing square dots in which case overlap need not be considered). In accordance with the method of the invention, dots are placed at locations in the reproduction matrix corresponding to pel locations in the picture element matrix in order of decreasing gray level beginning with the location corresponding to the pel having the highest gray level. This process is continued until an area in the reproduction matrix has been darkened which equals the gray level of the matrix calculated in accordance with the gray scale function, in the example, 0.000315 sq. in. (315 sq. mils). Thus, in the first darkening step, illustrated in FIG. 2, a dot is placed in reproduction matrix location 20a corresponding to pel 12a in the picture element matrix, having a gray level of (16). Since the dot has an area of 0.000044 sq. inc. (44 sq. mils), the area left to darken in the reproduction matrix is 0.000271 sq. in. ((271=315−44) sq. mils).

As illustrated in FIG. 3, in the second step of reproduction, a dot is printed in location 20f of the reproduction matrix corresponding to pel 12f also having a gray level of (16). The area of overlap on the diagonal of one dot for another is zero. Accordingly, the remaining area left to darken after the second step is 0.000227 sq. in. ((227=271−44) sq. mils).

Steps 3 and 4 of the darkening process are similar to step 2 in that dots are printed at reproduction locations 20k and 20q corresponding to pels 12k and 12q on the upper left to lower right diagonal. As shown in FIG. 1, these locations also have gray levels of (16).

After steps 3 and 4, the area left to darken is equal to 0.000139 sq. in. ((139=227−44−44) sq. mils). Moreover, after all locations corresponding to the picture elements having gray levels of (16) are printed, locations corresponding to picture elements of the next highest gray level are then printed. Thus, in step 5, a dot is printed at location 20b corresponding to pel 12b having a gray level of (7). When the dot is printed, there are two areas of overlap, namely with the dots printed at locations 20a and 20f. Accordingly, after the dot is printed at location 20b, the area left to be darkened equals 0.000115 sq. in. ((115=139−44+10+10) sq. mils).

The process continues through steps 6 through 8 printing dots at locations 20g, 20m and 20e, each corresponding to a pel having a gray level of (7). After step 6 through 8 the area left to be darkened is 0.000043 sq. in. ((43=115−24−24−24) sq. mils). (Each darkening step 6 through 8 prints one dot having two areas of overlap. Therefore, the total area of darkness added by each printing step equals 0.000024 sq. in. ) When a ninth dot is printed at location 20j also having a gray level of (7), the area left to be darkened equals 0.000019 sq. in. ((19=43−44+10+10) sq. mils). At this point, the area left to be darkened, 19 sq. mils is less than one-half of a dot area. Therefore, the printing is stopped since the gray level of the reproduction matrix now approaches the gray level of the picture element matrix in accordance with the quadratic function, as closely as possible within the resolving power of the system. If the area left to be darkened was greater than one-half of the dot area, another dot would be printed.

Therefore, in accordance with the method of the present invention, reproduction matrix locations corresponding to the picture element locations are darkened in order of decreasing pel gray level beginning with the location corresponding to the pel having the greatest gray level until the gray level of the reproduction matrix substantially equals the gray level of the pel matrix claculated in accordance with a given gray level function. Thus, the gray level distribution in the reproduction matrix substantially duplicates that in the pel matrix.

The method of the present invention which implements the exemplary process described above is illustrated in FIG. 6 in the form of a block diagram. The method comprises the step 30 of scanning each of the pels in the picture element matrix to determine its gray level and its location in the matrix. As will be described in greater detail below, the matrices into which the original image is divided may be arranged to form a larger matrix having co-extensive rows and columns of picture elements. Each individual matrix then may have n rows and m columns, in the example both n and m being equal to four. Accordingly, the scanning step may be performed across co-extensive rows of pels of adjacent matrices.

The scanning step generates sequential signals containing data indicative of the gray level and location in the picture element matrix of each of the scanned pels. The data contained in each signal is then stored in step 32 at least until all information relating to all pels in the picture element matrix has been received. Then, in accordance with step 34, the gray level of the picture element matrix is determined from the gray levels of each of the pels which comprise it. This matrix gray level may be expressed as an average pel gray level for the matrix as used in the example given above, or may be equal to the total of all gray levels of all pels in the matrix. Of course, any other suitable means of expressing the gray level of the picture element matrix may be used.

Once the gray level of the picture element matrix has been determined, the gray level of the reproduction matrix may be determined therefrom in step 36 in accordance with a gray scale function chosen with a view toward the image being reproduced. The gray level scale could be automatically chosen to be the most suitable by use of gradient analysis techniques. For example, it has been found that a linear gray scale function is best suited for reproducing textual material of alpha-numeric characters. A quadratic gray scale function such as that used in the example is best suited for reproducing pictorial information because it provides superior resolution and better representation of shading variations, and is, therefore, aesthetically pleasing.

Once the gray level of the reproduction matrix has been determined, the order in which reproduction matrix locations are darkened is determined in step 38 by looking up the data stored in step 32. Then darkening may be begun in step 40 at locations in order of decreasing gray level. (Of course, the calculated gray level of the reproduction array equals the calculated gray level of the picture element array in accordance with the chosen gray scale functions.) That is, the step 40 begins by darkening a location in the reproduction matrix corresponding to the location in the pel matrix having the highest gray level. Darkening continues at locations in the reproduction matrix in the order of decreasing gray level until the calculated gray level value of the reproduction matrix has been substantially equalled, as determined by steps 42 and 44. That is, after each darkening step 40, the actual reproduction matrix gray level is compared with the calculated reproduction matrix gray level in step 42.

If the difference determined in step 44 between the calculated and actual levels is greater than or equal to one-half the area darkened by each step 40, then step 40 is repeated. If the difference determined in step 44 is less than one half the area, step 40 is stopped in step 46, and the entire process is repeated for a next picture element matrix. It will be appreciated that the other techniques for determining substantial equality between the actual and calculated gray levels of the reproduction matrix may be employed.

FIG. 7 illustrates apparatus suitable for practicing the method of the present invention for reproducing a gray scale image. This apparatus, generally indicated at 50, comprises a video input device in the form of a scanner and support circuitry 52. It has been found that a Fairchild C.C.D. 121H Scanner manufactured by Fairchild Semi-Conductor Components Group, Fairchild Camera and Instrument Corporation, is satisfactory. This scanner is capable of scanning 200 picture elements per inch and can scan 1728 picture elements in a single line. Accordingly, the scanner is well suited for reproducing original images on 8½ inch paper for example, since there are 14 picture elements left over on either edge. Therefore, the entire image may be reproduced.

The scanner and support circuitry 52 generates a sequential digital output indicative of the gray level of each picture element in the scanned line as it is scanned. In the example wherein the gray level may range from (1) to (16), four binary bits are used to represent each gray level.

The scanner 52 feeds its digital output on four lines 53 to a one-to-eight demultiplexer 54 which is controlled by a dedicated computer or microprocesser in the form of a synchronous sequential machine 56 connected thereto by three lines 55. The demultiplexer is connected to each of eight shift registers $58a$ through $58h$ by four lines $59a$ through $59h$. Each of the registers has 1728 storage or register locations capable of storing four bits of pel data. Under the control of the synchronous sequential machine 56, the demultiplexer routes the pel data successively to each of the shift registers 58. That is, gray scale data relating to 1728 pels is routed to the first shift register $58a$. The gray scale data relating to the next scanned line of 1728 pels is routed to the next sequentially arranged shift register $58b$. When all shift registers have been filled, the process is repeated as will be described in greater detail below.

Since each pel matrix comprises sixteen picture elements arranged in a four-by-four array, it is apparent that a first group of four adjacent shift registers and, in particular, shift registers $58a$ through $58d$ are capable of storing all data relating 432 pel matrices. Similarly, a second group of four shift registers $58e$ through $58h$ are also capable of storing data relating to 432 pel matrices vertically displaced from the first group.

Each of the shift registers 58 is, in turn, connected to an eight-to-one multiplexer 60, by four lines $61a$ through $61h$. The multiplexer is connected to a memory in the form of a content addressable memory (CAM) 62 by four descriptor lines 66. Data held in the registers 58 is transferred to the CAM 62 through the multiplexer 60 under the control of the synchronous sequential machine 56 which is connected to the multiplexer by three lines 63. Each of the shift registers 58 is connected to an independent clock circuit of the machine 56 through eight lines 64.

While the shift registers are loaded, one at a time until completely filled, with data relating to 1728 pels, namely one scanned line of pels in the original image, data is loaded into the CAM simultaneously from four shift registers so that data on an entire matrix may be stored therein. In particular, the machine 56 controls shift registers $58a$ through $58d$ to simultaneously index data relating to all pels having the same relation to the horizontal coordinate of any matrix through the multiplexer into the CAM. Moreover, sequential operation of the demultiplexer, shift registers, and multiplexer to receive and transfer data is controlled by the machine 56 so that the data is loaded into the CAM from shift registers 58a through 58d through the multiplexer while data is loaded into shift registers 58e through 58h through the demultiplexer. Similarly, data is loaded into the CAM from the shift registers 58e through 58h through the multiplexer while data is loaded into shift registers 58a through 58d through the demultiplexer. In this manner, scanning may be continuous and machine efficiency is enhanced.

While the pel data relating to a given matrix is loaded into the CAM on descriptor lines 66, the gray level data for all pels is conducted to the machine 56 on lines 68 where it is summed and averaged. Once an average is determined, the machine 56 addresses a gray scale read only memory (ROM) 70, on line 72, that is programmed with the gray scale function in accordance with which the gray scale image is to be reproduced. The ROM performs a lookup function for the calculated average and transfers this value, equal to the gray level to be reproduced on the reproduction medium, back to the machine 56 on line 74.

Once the machine 56 has received the reproduction matrix gray scale value, it addresses the CAM on line 76 to determine the location of the pel in the picture element matrix having the highest gray scale value. (This is possible because all CAM storage locations may be addressed simultaneously.) It then addresses the corresponding location in a four-by-four random access memory (RAM) 77 that corresponds to the reproduction matrix on line 78 and loads the appropriate print or not print data, that is one data bit, therein on line 80. In accordance with the method described above, the RAM is loaded with data at the required locations until the stored reproduction matrix has a gray level equal to that calculated by the machine in accordance with the gray scale function. Specifically, the machine 56 performs a decrementing and comparing operation. That is, the total gray level area to be reproduced is decremented by the area to be darkened in each step, as explained in detail above. The resultant value is compared with the area to be darkened by each step. If the difference between the actual and calculated level is greater than or equal to one-half the area to be darkened the CAM reading and RAM loading functions continue; if less than one-half the area, the functions stop. After the RAM has been loaded in this manner, it may then be read by any suitable output device such as a video output device 82 in the form of a cathode ray tube or an ink jet printing device, to reproduce the original image.

The synchronous sequential machine 56 controls the various components of the apparatus described above so that various of the described operations are performed simultaneously. In particular, while the RAM is being read by the video output, the next matrix of pel data is loaded into the CAM. Accordingly, substantially continuous operation may be achieved and rapid image reproduction accomplished.

It can be seen that each pel requires four bits of data to represent its gray level. However, the RAM needs be provided with only one bit of data to store print or not print information. Therefore, each pel matrix comprises 64 bits of data but the reproduction matrix data storing RAM requires only sixteen bits. Hence a substantial data compression is achieved. Moreover, the resolution of this system is optimized within the capability of the system. That is, if the printing or darkening device is capable of darkening 200 locations per inch, the scanning mechanism can similarly scan 200 pels per inch on the original image. Further, resolution is optimized, since the distribution of pel gray levels is reproduced.

It will be appreciated from the above description that the method and apparatus of the present invention is capable of reproducing gray scale images with greater fidelity and resolution than prior art apparatus. This is because each matrix of pel data is analyzed and processed to reproduce the gray level distribution matrix image in as close an approximation of the scanned pel matrix gray level distribution as is possible, within the limits of printing or not printing a dot on a finite matrix. This is possible because orders of the gray scale function higher than the first order are utilized in reproduction. Moreover, the apparatus of the invention is designed to achieve more rapid reproduction than prior art devices which had made them less than completely satisfactory.

Accordingly, although specific embodiments of the method and apparatus of the present invention have been described above in detail, it is understood that this is for purposes of illustration. Modifications may be made to the described method and apparatus in order to adapt them to particular image reproducing applications.

What is claimed is:

1. A method of reproducing, on a reproduction medium, an original gray scale image that may be divided into an array of discrete picture elements, said method comprising the steps of:
   A. scanning each of said picture elements to determine its gray level and its location in said picture element array, to thereby generate gray level data representative of the gray level and location data representative of the location in said picture element array of each said picture element;
   B. calculating the gray level of the picture element array from the gray level data representative of each of said individual picture elements in accordance with a gray scale function, and
   C. on said reproduction medium in an array of reproduction locations corresponding to the locations of picture elements in said picture element array, by using said gray level data and said location data, sequentially darkening reproduction locations in the order of decreasing picture element gray level, beginning with the reproduction location that corresponds to the location in said picture element array of the one of said picture elements having the darkest gray level, until the actual gray level of said array of reproduction locations substantially equals the calculated gray level of said picture element array, whereby the distribution of darkened reproduction locations within said array of reproduction locations approaches the distribution of the gray level of said picture elements within said picture element array.

2. The method of reproducing an original gray scale image as claimed in claim 1, wherein said calculating step comprises:
   calculating the average gray level of picture elements in the picture element array; and
   calculating the gray level of the reproduction array from the calculated average in accordance with the gray scale function.

3. The method of reproducing an original gray scale image as claimed in claim 1, wherein said darkening step comprises the step of:
   printing dots on a reproduction medium.

4. The method of reproducing an original gray scale image as claimed in claim 3 wherein said reproduction medium is a sheet of white material and wherein said printing step comprises the step of:

printing black dots on said reproduction material.

5. The method of reproducing an original gray scale image as claimed in claim 1 wherein said picture element array is in the form of a rectangular matrix of picture elements; wherein at least one matrix is constituted by n picture element rows, n being equal to the number of picture elements along the vertical coordinate of said matrix, the number of picture elements in each row being equal to at least the number of picture elements along the horizontal coordinate of said matrix and wherein said scanning step comprises the step of sequentially scanning one row of picture elements at a time.

6. The method of reproducing an original gray scale image as claimed in claim 5, further comprising the step of:

storing the gray level and location data relating to the scanned picture elements, generated as each row is scanned, at least until n rows have been scanned.

7. The method of reproducing an original gray scale image as claimed in claim 6 further comprising the step of:

simultaneously loading, into a memory, the gray level and location data for all picture elements in the same location relative to the horizontal axis of said matrix in all of said n rows until all of the gray level and location data for all of the picture elements in said matrix are loaded into the memory.

8. The method of reproducing an original gray scale image as claimed in claim 7 wherein a plurality of matrices of picture elements are constituted by a multiple of n rows of picture elements and wherein, while said loading step is performed for a first n rows of picture elements, said scanning and storing steps are performed for another n rows of picture elements.

9. The method of reproducing an original gray scale image as claimed in claim 7 wherein a plurality of matrices of picture elements are constituted by 2n rows of picture elements and wherein said scanning and storing steps are performed for a first n rows of picture elements while said loading step is performed for a second n rows of picture elements, and said scanning and storing steps are performed for said second n rows while said loading step is performed for said first n rows.

10. The method of reproducing an original gray scale image as claimed in claim 1 further comprising the step of:

after each sequentially performed darkening step, comparing the actual gray level of the array of reproduction locations with the calculated gray level of the picture element array to determine when the two are substantially equal.

11. The method of reproducing an original gray scale image as claimed in claim 10 further comprising the step of:

stopping said sequential darkening steps when the difference between the actual and calculated gray levels yielded by said comparing step is less than one-half the gray level capable of being reproduced by each of said darkening steps.

12. An apparatus for reproducing, on a reproduction medium, an original gray scale image that may be divided into an array of discrete picture elements, said apparatus comprising:

A. a scanner for scanning each of the picture elements in the picture element array to determine its gray level and generate gray level data representative of the gray level and location data representative of the location in the picture element array of each of said picture elements;

B. memory means for storing the gray level data and location data relating to each of said picture elements in said picture element array;

C. calculating means connected to said memory means for calculating the gray level of the picture element array from the gray level data representative of each of said picture elements therein and for calculating therefrom the gray level of a reproduction array of reproduction locations corresponding to the picture element locations in said picture element array in accordance with a gray scale function;

D. reproduction means for darkening selected reproduction locations in said reproduction array, on the reproduction medium, and E. control means connected to said memory means and said calculating means, for using said gray level data, said location data, and said calculated gray level of said reproduction array to control said reproduction means to sequentially darken reproduction locations in said reproduction array in order of decreasing picture element gray level, beginning with the reproduction location that corresponds to the location in said picture element array of the one of said picture elements having the darkest gray level, until the actual gray level of said reproduction array substantially equals the calculated gray level of the reproduction array, whereby the distribution of darkened reproduction locations within said reproduction array approaches the distribution of the gray level of said picture elements within said picture element array.

13. The apparatus for reproducing, on a reproduction medium, an original gray scale image which may be divided into an array of discrete picture elements as claimed in claim 12, wherein said picture element array is in the form of a rectangular matrix of picture elements and wherein at least one matrix is constituted by n rows of picture elements, n being equal to the number of picture elements in the vertical coordinate of said matrix and wherein said memory means comprises:

n shift registers, each having m sites for storing picture element gray level and location data, m being at least equal to an integer multiple of the number of picture elements in the horizontal coordinate of said matrix.

14. The apparatus for reproducing, on a reproduction medium, an original gray scale image which may be divided into an array of discrete picture elements as claimed in claim 13, wherein said scanner scans said matrix one row at a time and wherein said apparatus further comprises:

demultiplexer means for routing gray level and location data relating to each of said n rows of picture elements to a different one of said n shift registers.

15. The apparatus for reproducing, on a reproduction medium, an original gray scale image which may be divided into an array of discrete picture elements as claimed in claim 13, wherein said memory means further comprises:

a content addressable memory for storing gray level and location data relating to all picture elements in said matrix.

16. The apparatus for reproducing, on a reproduction medium, an original gray scale image which may be divided into an array of discrete picture elements as claimed in claim 15, further comprising:

multiplexer means for simultaneously loading the gray level and location data relating to all picture elements in the same location relative to the horizontal coordinate of said matrix into said content addressable memory from all of said n shift registers.

17. The apparatus for reproducing, on a reproduction medium, an original gray scale image which may be divided into an array of discrete picture elements as claimed in claim 12, wherein said picture element array is in the form of a rectangular matrix of picture elements and wherein at least one matrix is constituted by n rows of picture elements, n being equal to the number of picture elements in the vertical coordinate of said matrix and wherein said apparatus comprises:

first and second n shift registers each having m sites for storing picture element gray level and location data, m being at least equal to an integer multiple of the number of picture elements in the horizontal coordinate of said matrix, demultiplexer means for routing said gray level and location data relating to each of said n rows of picture elements to a different one of said shift registers;

a content addressable memory capable of storing simultaneously gray level and location data relating to all picture elements in one matrix, said shift registers and content addressable memory constituting said memory means, multiplexer means for loading gray level and location data stored in said shift registers into said content addressable memory, a synchronous sequential machine comprising at least a part of said control means, connected to said demultiplexer, shift registers and multiplexer to control said demultiplexer to route gray level and location data relating to each of a first n rows of picture elements to a different one of said shift registers in one of said first and second n shift registers and to simultaneously control said multiplexer to simultaneously load said data relating to all picture elements in the same location relative to the horizontal coordinate of said matrix into said content addressable memory from all of the other of said first and second n shift registers.

18. The apparatus for reproducing, on a reproduction medium, an original gray scale image which may be divided into an array of discrete picture elements as claimed in claim 12 wherein said calculating means comprises:

a gray scale read only memory programmed in accordance with said gray scale function.

19. The apparatus for reproducing, on a reproduction medium, an original gray scale image which may be divided into an array of discrete picture elements as claimed in claim 18 wherein said calculating means further comprises:

said control means which determines the gray level of said picture array from the gray level data representative of each of said picture elements stored in said memory means and which addresses said read only memory with said calculated gray level to calculate the gray level of said reproduction array in accordance with said function.

20. The apparatus for reproducing, on a reproduction medium, an original gray scale image which may be divided into an array of discrete picture elements as claimed in claim 12, wherein said reproduction means comprises:

a printer for printing dots on a reproduction medium.

21. The apparatus for reproducing, on a reproduction medium, an original gray scale image which may be divided into an array of discrete picture elements as claimed in claim 12, wherein said reproduction means comprises:

a video output in the form of a cathode ray tube.

22. An apparatus for reproducing, on a reproduction medium, an original gray scale image that may be divided into matrices of discrete picture elements each having n picture elements along its vertical coordinate and m picture elements along its horizontal coordinate, said apparatus comprising:

A. a scanner for scanning each of the picture elements in the picture element matrices and for generating gray level data representative of the gray level and location data representative of the location of each said picture element in each said matrix;

B. first and second n shift registers each having an integer multiple of m sites for storing picture element gray level data and location data;

C. a demultiplexer interconnecting said scanner and said shift registers for routing gray level and location data relating to each of said n rows of picture elements in each said matrix to a different one of said shift registers;

D. a content addressable memory capable of storing simultaneously the gray level and location data relating to all picture elements in one matrix;

E. a multiplexer interconnecting said shift registers and content addressable memory for loading data stored in said shift registers into said content addressable memory;

F. a read only memory programmed in accordance with a gray scale function to provide a reproduction matrix gray level from the gray level data representative of the gray levels of said picture elements in each said matrix;

G. reproducing means for darkening reproduction locations on a reproduction medium, arranged in a reproduction matrix of reproduction locations corresponding to locations of said picture elements in each said picture element matrix, and H. a synchronous sequential machine
   1. connected to said demultiplexer, shift registers and multiplexer to control said demultiplexer to route gray level and location data relating to each of a first n rows of picture elements to a different one of said shift registers in one of said first and second n shift registers and to simultaneously control said multiplexer to simultaneously load the gray level and location data relating to all picture elements in the same location relative to the horizontal coordinate of each said matrix into said content addressable memory from all of the other of said first and second n shift registers,
   2. connected to said content addressable and read only memories to determine the gray level of each said picture element matrix from the gray level data, representative of all picture elements in said matrix stored in said content addressable memory and to address said read only memory to determine the gray level of said reproduction matrix, and 3. connected to said reproducing means to control it, using said gray level data, said location data and the determined gray level of said reproduction matrix, to sequentially darken reproduction locations in said reproduction matrix in order of decreasing picture element gray level beginning with the reproduction location that corresponds to the location in the picture element matrix of the one of the picture elements having the darkest gray level until the actual gray level of said reproduction matrix substantially equals the calculated gray level of said reproduction matrix, whereby the distribution of darkened reproduction locations with the matrix of reproduction matrix approaches the distribution of the gray level of said picture elements within said picture element matrix.

23. The method of reproducing an original gray scale image as claimed in claim 1, wherein said calculating step comprises:
calculating the average gray level of picture elements in the picture element array;
calculating the gray level of the reproduction array from the calculated average in accordance with the gray scale function; and
calculating the higher order moments of the gray scale distribution.

* * * * *